US007230349B2

(12) United States Patent
Johnsen et al.

(10) Patent No.: US 7,230,349 B2
(45) Date of Patent: Jun. 12, 2007

(54) HIGH INTENSITY DISCHARGE LAMP BALLAST WITH ANTI-THEFT OPERATING MODE

(76) Inventors: Andrew O. Johnsen, 31 Winthrop St., Danvers, MA (US) 01923; Vipin Madhani, 2 Wing Ter., Burlington, MA (US) 01803; Guy P. Bouchard, 32 Pratt Ave., Beverly, MA (US) 01915

( * ) Notice: Subject to any disclaimer, the term of this patent is extended or adjusted under 35 U.S.C. 154(b) by 0 days.

(21) Appl. No.: 11/248,730

(22) Filed: Oct. 12, 2005

(65) Prior Publication Data

US 2006/0097661 A1 May 11, 2006

Related U.S. Application Data

(60) Provisional application No. 60/619,820, filed on Oct. 16, 2004.

(51) Int. Cl.
*H01H 47/22* (2006.01)
*B60R 25/10* (2006.01)
*B60Q 1/02* (2006.01)
(52) U.S. Cl. .............................. 307/10.2; 340/426.16; 315/82
(58) Field of Classification Search ................
340/426.14–426.16, 426.35, 426.36, 514, 340/515–517; 307/10.2, 10.4, 10.5, 10.8; 315/76, 77, 80, 82
See application file for complete search history.

(56) References Cited

U.S. PATENT DOCUMENTS

| 4,170,747 | A | | 10/1979 | Holmes |
| 4,990,906 | A | * | 2/1991 | Kell et al. .................. 340/5.23 |
| 5,180,218 | A | | 1/1993 | Ohshio |
| 5,583,383 | A | * | 12/1996 | Denz et al. ................. 307/10.2 |
| 5,709,451 | A | | 1/1998 | Flora et al. |
| 5,945,784 | A | | 8/1999 | Mattas |
| 6,194,843 | B1 | | 2/2001 | Moisin |
| 6,573,615 | B1 | * | 6/2003 | Asakura et al. .............. 307/9.1 |
| 6,707,263 | B1 | | 3/2004 | Prasad |
| 6,841,951 | B2 | | 1/2005 | Chen et al. |
| 6,879,247 | B2 | * | 4/2005 | Shimomura et al. ... 340/426.18 |
| 6,906,467 | B2 | | 6/2005 | Stam et al. |
| 2002/0003472 | A1 | * | 1/2002 | Haruna et al. .............. 340/426 |

* cited by examiner

*Primary Examiner*—Shih-Chao Chen
*Assistant Examiner*—Minh Dieu A
(74) *Attorney, Agent, or Firm*—John H. Pearson, Jr. Esq.; Walter F. Dawson, Esq.; Pearson & Pearson, LLP.

(57) ABSTRACT

A high intensity discharge (HID) assembly comprises ballast circuits which includes a micro-controller, and an HID headlamp. In order to deter theft of the HID assembly from a vehicle, the micro-controller communicates with a vehicle computer, checks the VIN of the vehicle, and if the micro-controller does not recognize the VIN, causes the HID headlamp to operate in a flickering power output mode. The ballast circuits include a power control circuit, a lamp current regulator, a 400v regulator, a current sense circuit, a turn-on synchronization circuit, a shut down circuit, and a pulse width modulator.

8 Claims, 4 Drawing Sheets

HIGH INTENSITY DISCHARGE LAMP BALLAST WITH ANTI-THEFT OPERATING MODE

CROSS-REFERENCE TO RELATED APPLICATION

This is a nonprovisional patent application claiming priority of provisional application for patent No. 60/619,820, filed Oct. 16, 2004.

BACKGROUND OF THE INVENTION

1. Field of the Invention

This invention relates generally to high intensity discharge (HID) headlamps for vehicles and in particular to an apparatus and method for causing an HID headlamp to flicker when operating in a vehicle because it does not belong in that particular vehicle.

2. Description of Related Art

In a high intensity discharge bulb, a high voltage is passed through a metallic salt. The metallic salt in a sealed container becomes gaseous, passing an electrical arc. The illumination given off by the arc is initialized for headlamps. HID headlamps have several advantages over incandescent bulb headlamps as described in U.S. Pat. No. 5,709,451 issued to Flora et al. in 1998. One advantage is that the HID bulb gives off a blue-tinted light which is closer to natural sunlight and illuminates phosphorous signs better, making them stand out more at night. Another advantage of HID headlamps is that they consume less electrical energy, are more reliable, and give off less heat, thereby giving more flexibility in the design of the reflector housing and other items packaged near the headlamp. Conventional automotive applications of HID headlamps are disclosed in U.S. Pat. No. 5,180,218 issued to Ohshio in 1993.

Because of the advantages of HID headlamps and the fact that they are more costly than incandescent headlamps, they are experiencing a high rate of theft, causing a financial problem and inconvenience to vehicle owners with said HID headlamps in their vehicles. Therefore, it would be very advantageous to provide within an HID headlamp, a circuit that would provide an indication that a stolen HID headlamp does not belong in the vehicle in which it is installed, and does not prevent safe use of the vehicle with the stolen HID headlamp at night.

SUMMARY OF THE INVENTION

Accordingly, it is therefore an object of this invention to provide an HID headlamp assembly with an anti-theft mode of operation when installed in a wrong vehicle.

It is another object of this invention to provide a ballast circuit for an HID headlamp that causes it to operate in a flickering mode to indicate it is not installed in the vehicle it belongs in and may be stolen.

It is a further object of this invention to provide a ballast circuit for driving an HID headlamp that checks the vehicle identification number of the vehicle in which it is installed and causes the HID headlamp to operate in a theft operating mode if the VIN number is not recognized.

These and other objects are further accomplished by a ballast circuit for energizing an HID lamp having an anti-theft operating mode comprising means for testing a signal from a vehicle to verify a vehicle code matches an HID lamp code, and when there is no match, the testing means initiates the anti-theft operating mode, and means for regulating an operating current of the HID lamp in accordance with a signal from the testing means, wherein the HID lamp output power fluctuates between a normal output power level and a predetermined lower output power level. The testing means comprises a preprogrammed micro-controller. The regulating means includes a pulse width modulator for controlling the output power level fluctuations. The HID lamp output power fluctuation produces a flickering light output at predetermined levels sufficient to maintain safe vehicle operation.

These and other objects are further accomplished by a ballast circuit for energizing and controlling an HID lamp having a normal mode of operation and an anti-theft mode of operation comprising means for generating required voltage and current for operating the HID lamp from a predetermined input voltage; means for monitoring the operating current of the HID lamp and generating a current sense signal, means for regulating the HID lamp current in response to an HID lamp current control signal, means for modulating a duty cycle of the voltage and current generating means for operating the HID lamp in response to the current sense signal and the HID lamp current control signal, and means for synchronizing the duty cycle modulating means in response to a switching signal from the voltage and current generating means. The ballast circuit generates a shut down signal for shutting down the duty cycle modulating means when predetermined proper operating conditions do not exist. The ballast circuit comprises means for determining the HID lamp mode of operation and monitoring the HID lamp current in order to generate the HID lamp current control signal. The HID lamp current control signal comprises a first voltage level for selecting an HID lamp normal mode of operation and a second voltage level for selecting an HID lamp anti-theft mode of operation.

These and other objects are further accomplished by a method for operating a high intensity discharge (HID) lamp in a normal mode and an anti-theft mode comprising the steps of testing a signal from a vehicle with means to verify a vehicle code matches an HID lamp code, and when there is no match initiating the anti-theft operating mode, and regulating an operating current of the HID lamp in accordance with a signal from the testing means, wherein the HID lamp output power fluctuates between a normal output power level and a predetermined lower power level. The step of testing a signal from a vehicle to verify a vehicle code matches the HID lamp code comprises the step of providing a preprogrammed micro-controller to perform the testing. The step of regulating an operating current of the HID lamp in accordance with a signal from the testing means comprises the step of providing a pulse width modulator for controlling the output power level fluctuations. The step of regulating an operating current of the HID lamp with a signal from the testing means comprises the step of providing HID lamp output power fluctuations which are sufficient to maintain safe vehicle operation.

These and other objects are further accomplished by a method of operating a high intensity discharge (HID) lamp in a normal mode and an anti-theft mode comprising the steps of producing in a power control circuit required voltage and current to operate the HID lamp from a predetermined input voltage, monitoring the produced current for the HID lamp and generating a current sense signal, regulating the HID lamp current in response to an HID lamp current control signal, providing a pulse width modulator for modulating a duty cycle of the power control circuit in response to the sensed HID lamp current and the HID lamp current control signal, and synchronizing the pulse width modulator in response to a switching signal from the power control circuit. The method further comprises the step of providing a shutdown signal for shutting down the pulse width modulator when predetermined power operating conditions are not present. The method further comprises the steps of providing a micro-controller to determine the HID lamp mode of operation by testing an HID lamp code, and monitoring the HID lamp current by the micro-controller to generate the HID lamp current control signal in accordance with the results of the HID lamp code test. The step of monitoring the HID lamp current by the micro-controller to generate the HID lamp current control signal comprises the step of providing the lamp current control signal with a first voltage level for an HID lamp normal mode of operation and a second voltage level for an HID lamp anti-theft mode of operation.

Additional objects, features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENT

Figure 1:
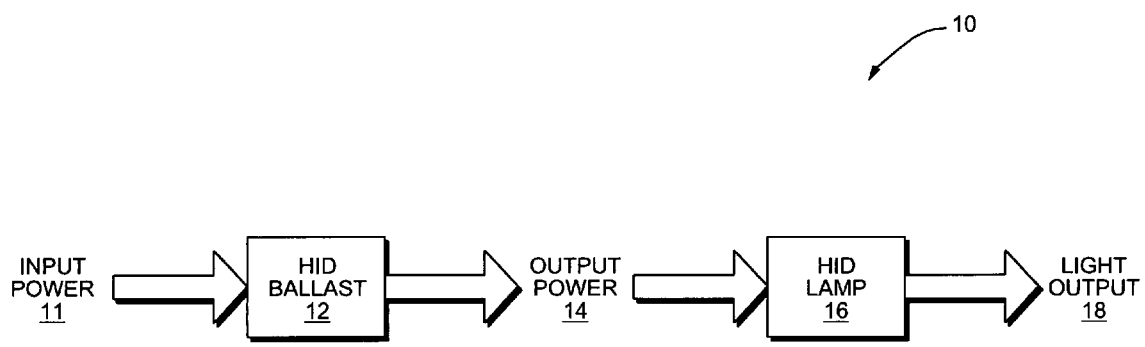
FIG. 1 is a general block diagram of a high intensity discharge lighting system according to the present invention.

Referring to FIG. 1, a general block diagram of a high intensity discharge (HID) lighting system 10 is shown comprising an HID Ballast 12 which receives input power 11 from a power source in a vehicle and regulates and controls output power 14 to an HID lamp 16 which produces illumination.

Figure 2:
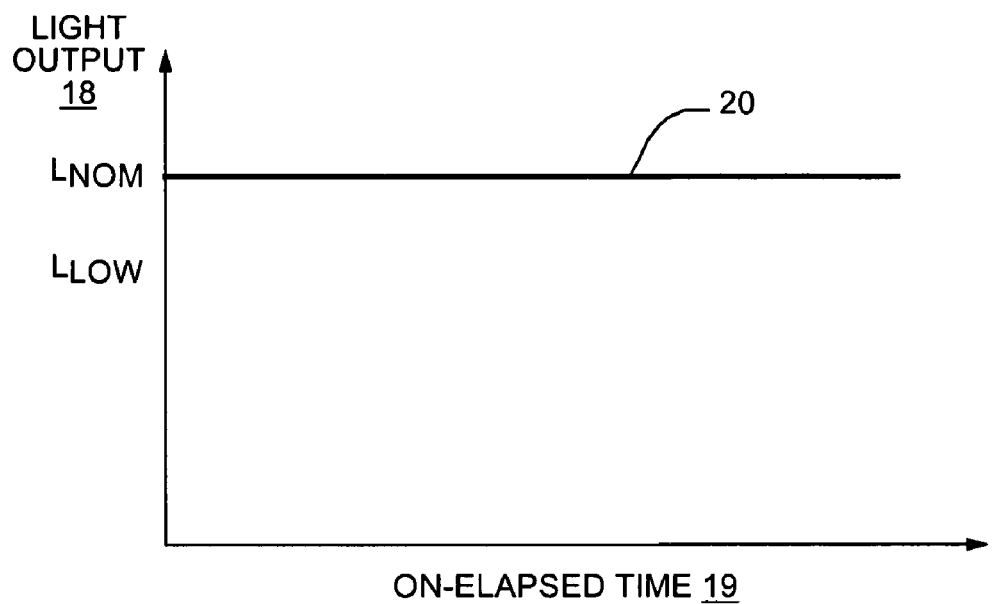
FIG. 2 is a graph showing a normal light output from a HID headlamp which is constant as a function of ON-ELAPSED time.
Figure 3:
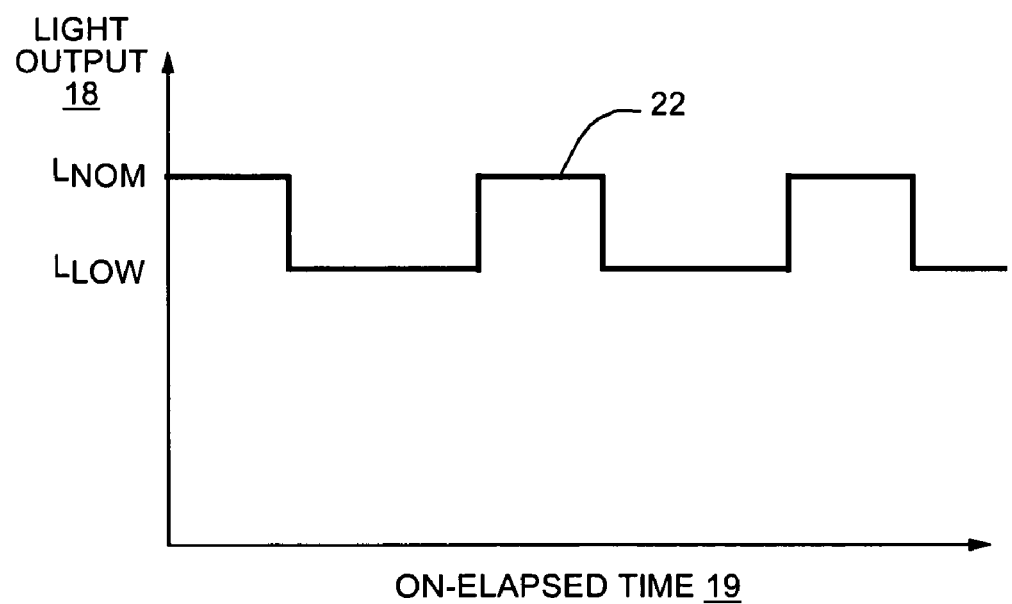
FIG. 3 is a graph showing the light output from an HID headlamp as a function on ON-time when it comprises the present invention and it is installed in a wrong vehicle.

Referring to FIG. 2 and FIG. 3, FIG. 2 shows a graph of a normal light output 18 as a function of on-elapsed time 19 and line 20 represents a constant level of light output from the HID lamp 16 under normal operating conditions. Because of the advantages of HID lighting systems 10 and the fact that they are more costly than incandescent headlamps, they experience a high rate of theft. The present invention provides a way to reduce HID headlamp assembly theft by creating an operating mode for the stolen headlamp assembly whereby the HID lamp operates with a noticeable flicker. This anti-theft operating mode does not create a nighttime driving impairment in order to avoid the liability of completely shutting down the light system of a vehicle.

FIG. 3 is a graph showing the light output 18 from the HID lamp 16 as a function of on-elapsed time 19 when operated with the present invention. The normal light output 22 becomes a repetitive step output switching between a normal light output level ($L_{NOM}$) and a lower light output level ($L_{LOW}$) which produces the noticeable flickering effect.

Figure 4:
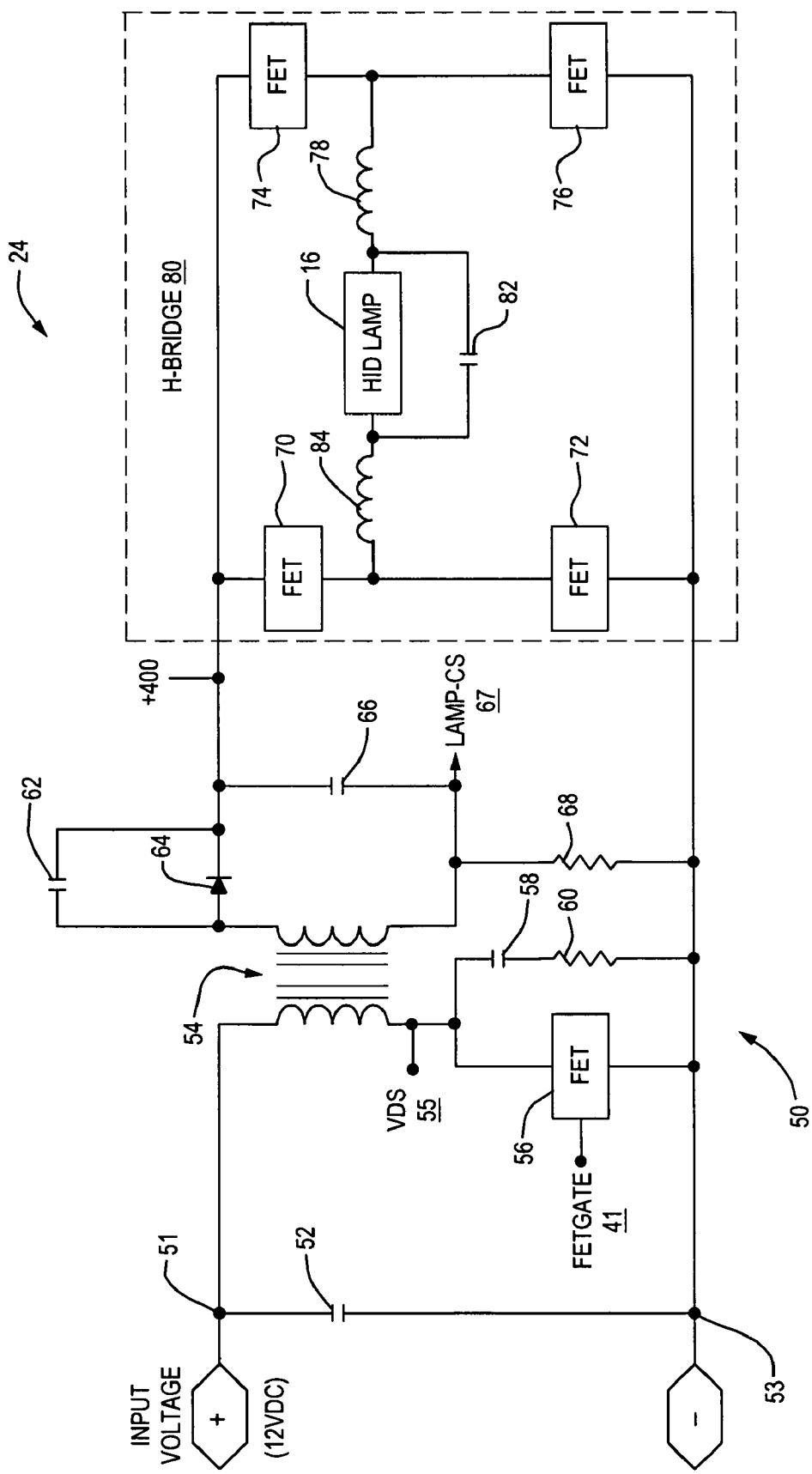
FIG. 4 is a schematic diagram of a ballast control circuit for an HID headlamp.
Figure 5:
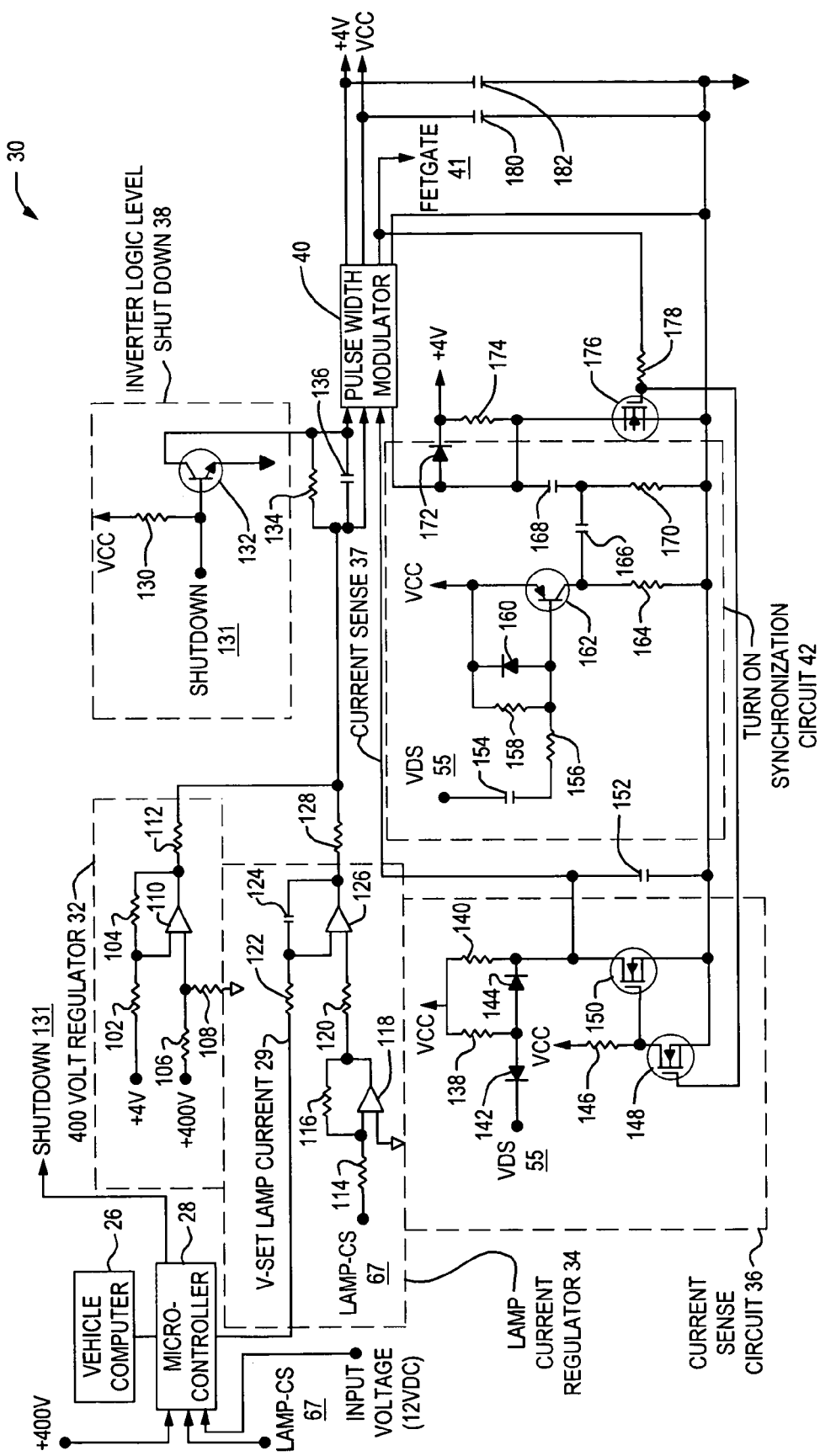
FIG. 5 is a schematic diagram of ballast's circuits which include providing an HID headlamp with an anti-theft mode of operation.

Referring to FIG. 4, a schematic diagram is shown of a power control circuit 24 which is part of the HID ballast 12 in FIG. 1 for operating an HID lamp 16. FIG. 5 shows the other circuits 30 of the HID ballast 12 which provide for the anti-theft operating mode. The power control circuit 24 comprises an H-Bridge 80 connected between a common terminal 53 (e.g. Ground) and a power line (e.g. +400 v line) and a flyback inverter circuit 50 connected to the H-Bridge 80. The flyback inverter circuit 50 provides higher current and higher voltage for operating the HID lamp 16, based on an input voltage which is typically 12 VDC in a vehicle, and the H-Bridge 80 provides an AC voltage for operating the HID lamp 16. The H-bridge 80 comprises four (4) field effect transistors (FET) 70, 72, 74, and 76, where two of the FETs 72 and 74 are connected to the common terminal 53. The H-bridge 80 is connected to the HID LAMP 16 at the second terminals of FETs 70 and 74. Inductors 78 and 84 reduce radiated emissions when the polarity of the lamp 16 is switched by the H-Bridge 80. Capacitor 82 is used in conjunction with Inductors 78 and 84 to create a noise filter to reduce the radiated emissions when the polarity of the lamp 16 is switched by the H-Bridge 80.

The flyback inverter circuit 50, which connects to the H-bridge 80, includes a transformer 54 having a primary winding connected between a power terminal 51 and a FET 56, and a secondary winding connected between the +400V power and a current sense resistor 68. A diode 64 and capacitors 62 and 66 are connected to the secondary winding terminals. The diode 64 is used to rectify the AC waveform from the secondary winding of transformer 54. The rectified signal is used to charge the 400 v output capacitor 66. Output capacitor 66 is used to reduce the ripple across the HID lamp 16 output and also to store energy which is used to help in HID lamp 16 ignition. Capacitor 62 is used to reduce the ringing at turn-on of diode 64. A capacitor 58 is in series with resistor 60 and they connect across the FET 56 for snubbing of the primary waveform when FET 56 is turned-off. The snubbing reduces ringing, which in turn reduces radiated and conducted EMI. The voltage drop across the current sense resistor 68 is not in the ground path driving the FETs of the H-bridge 80. The current sense resistor 68 monitors the current output of the secondary winding of transformer 54 generally eliminating or reducing the influence of large boost currents that may be present during lamp starting. A VDS 55 signal at the primary terminal of transformer 54 and a LAMP-CS 67 signal at the secondary terminal of transformer 54 are provided to the anti-theft mode circuits shown in FIG. 5. The VDS 55 signal represents the voltage across FET 56 when it is switched-ON and this voltage provides a measure of the current in FET 56. When the trailing edge of VDS 55 starts to fall, a pulse is created that resets the PWM 40. The LAMP-CS 67 signal monitors the current in the HID lamp 16.

The transformer 54 may be embodied by part number B66482-S1001-X149 manufactured by EPCOS of Munich, Germany. The FETs 70–76 may be embodied by part number STD5NM50 manufactured by ST of Geneva, Switzerland. The approximate values of the components in the preferred embodiment of the ballast control circuit 24 are as follows: capacitor 52 is 6 microfarads, capacitor 58 is 110 picofarads, capacitor 62 is 330 picofarads, capacitor 66 is 0.27 microfarads; resistor 60 is 10 ohms and resistor 68 is 2.7 ohms; inductors 78 and 84 are bead ferrites and are embodied by part number 2518066007Y3 manufactured by Fair Rite of Wallkill, N.Y.; diode 64 may be embodied by part number RHRD660S manufactured by Fairchild of South Portland, Me.; the FET 56 may be embodied by a MOSFET transistor, part number HUFZ5639S3S manufactured by Fairchild; the HID lamp 16 may be embodied by Model No. D1 XENON Metal Halite manufactured by Sylvania of Danvers, Mass.

Referring now to FIG. 5, a schematic diagram is shown of the circuits 30 for providing the anti-theft mode of operation of the HID lamp 16 when installed in a wrong vehicle. A micro-controller 28 maintains a serial communication link with a computer 26 of a vehicle in which the HID lamp 16 is installed. The vehicle computer 26 transmits a code or vehicle identification number (VIN) of the vehicle to the micro-controller 28 and the micro-controller 28 verifies if this code or VIN number is the number the ballast circuits recognize for operating with this HID lamp 16. If the micro-controller 28 does not recognize the code or VIN number from the vehicle's computer 26, the micro-controller 28 will pulse the V-set lamp current signal 29 which is sent to the lamp current regulator 34 causing the light output 18 to operate in a flickering or switching mode between an output of approximately 28 and 35 watts. If the code or VIN number from the vehicle computer 28 is recognized then the V-set lamp current signal 29 from the micro-controller 28 will allow the HID lamp 16 to operate at a steady 35 watt output.

The micro-controller 28 is used to control all functions of the HID lamp 16 including setting and monitoring power to the lamp 16 to assure a stable run-up of a cold or hot lamp and steady state output power. In particular, micro-controller 28 receives +400 voltage, a LAMP-CS 67 signal for monitoring the HID lamp 16 current, and the input voltage (12 VDC), and generates a V-set lamp current signal 29 to a lamp current regulator 34 which causes the HID lamp 16 to operate at a steady 35 watts output or to operate in a theft mode flickering between 28 watts and 35 watts. The micro-controller 28 may be embodied by part number PIC16C716-04E/SS manufactured by Microchip of Chandler, Ariz. The micro-controller 28 generates a shutdown 131 signal which shuts down a pulse width modulator 40 when certain conditions exist described below.

Still referring to FIG. 5, the circuits include a 400 volt regulator 32 for monitoring the 400 v signal. The regulation is done by comparing a fixed reference of +4 volts to a scaled down lamp voltage. The +4V reference is fed to the op-amp 110 via resistor 102 and resistor 104 is used to set the gain. The junction of resistor 102 and 104 is used to compare it to the voltage of the lamp scaled done by resistors 106 and 108. When the lamp voltage is below +400V, op-amp 110 drives the output low to resistor 112 demanding more power. After the output voltage reaches 400 Volts the op-amp 110 output will go high reducing the width of pulses from the PWM 40 through resistor 112.

The 400 VOLT regulator 32 includes components with approximate values as follows: resistor 102 and 104 are each 100 k, resistor 106 is 1,000 k, resistor 108 is 10 k and resistor 112 is 20 k; the op-amp 110 is included in part number LM2902D manufactured by Texas Instruments of Dallas, Tex.

A lamp current regulator 34 is provided for monitoring the HID lamp current signal, LAMP-CS 67, from flyback inverter circuit 50, and it receives the V-set lamp current 29 signal from the micro-controller 28. It is with this signal that the micro-controller 28 controls running-up a cold lamp to a warm lamp without damaging the HID lamp 16 and to meet light output specifications. The lamp current regulator 34 circuit compares the requested current settings from the micro-controller 28 to the actual current in the HID lamp 16 which is monitored by the lamp current sense signal (LAMP-CS) 67. The lamp current sense signal (LAMP-CS) 67 is amplified by op-amp 118 and resistors 114 and 116 and this amplified signal is fed into the error amplifier 126 via resistor 120. Op-amp 126 compares this amplified signal to the micro-controller's requested current via resistor 122. The current amplifier 126 is stabilized by feedback capacitor 124. When the lamp current is below the micro-controller requested current, op-amp 126 drives the output low to resistor 128 demanding more power to the lamp 16. After the output current to the HID lamp 16 reaches the requested current, the op-amp output will go high reducing the duty cycle of the PWM 40 output through resistor 128. This in turn will reduce the output power of the flyback inverter circuit 50 reducing the output current in the Lamp-CS 67 signal.

The lamp current regulator 34 includes components with approximate values as follows: resistor 114 is 4 k, resistor 116 is 13 k, resistor 120 is 4 k, resistor 122 is 20 k, resistor 128 is 20 k and capacitor 124 is 47 nanofarads. The op-amps 118 and 126 are included in part number LM2902D manufactured by Texas Instruments.

The current sense circuit 36 is provided for monitoring current in FET 56 of flyback inverter circuit 50. The current is fed back for over-current protection and control loop stability of the flyback inverter 50. When the FET 56 is OFF the FETGATE 41 signal goes low which turns-off mosfet 148 in the current sense circuit 36. With mosfet 148 OFF the gate of mosfet 150 is pulled high through resistor 146. In this state, mosfet 150 is ON holding the current sense circuit output 37 at zero volts. When the FETGATE 41 signal switches high, FET switch 56 is turned-on. At this time the VDS 55 signal is proportional to the resistance from drain to source (RDS-ON) of FET 56 and the current in FET 56. It is also in this state that mosfet 148 is turned-on holding mosfet 150 in the OFF state. Now the current sense 37 signal to PWM 40 is free to follow the VDS 55 signal through resistors 138 and 140 and diodes 142 and 144. The resulting current sense 37 signal waveform will be low when FETGATE 41 is low and ramp-up in voltage when FETGATE 41 is high. Capacitor 152 is used to reduce the switching noise.

The current sense circuit 36 includes components with approximate values as follows: resistor 138 is 10 k, resistor 140 is 100 k, and resistor 146 is 10 ohms; diode 142 is part number BAS19 manufactured by ON Semiconductor of Austin, Tex. The MOS-FETS 148 and 150 may be embodied by part number 2N7002 manufactured by Fairchild. In addition, the capacitor 152 is 220 picofarads.

A turn-on synchronization circuit 42 receives the VDS 55 signal from the primary terminal of the transformer 54. The main purpose of this circuit is to synchronize the turn-off of FET 56 with the falling edge of the VDS 55 signal which allows for zero voltage turn-on of FET 56. Zero voltage turn-on provides for a more efficient ballast 12 operation and reduced radiated emissions. With no edge, transistor 162 is held in the OFF state. Diode 160 prevents transistor 162 from saturating for faster switching. Resistor 158 holds the base to emitter voltage of transistor 160 low. Detection of VDS 55 signal is done through capacitor 154 and resistor 156. When VDS 55 signal goes low, it turns-on transistor 162. This causes a pulse of current into Resistor 164, resulting in a voltage pulse across capacitor 166. The voltage pulse across capacitor 166 goes into the pulse width modulator (PWM) 40 through resistor 170 and capacitor 168. When the PWM 40 circuit receives this pulse, it generates the FETGATE 41 signal which turns FET 56 ON providing the synchronized turn-on of FET 56. Diode 172 clamps any excessive voltage pulses from damaging the PWM 40 chip.

The turn-on synchronization circuit 42 includes components with approximate values as follows: resistor 156 is 470 ohms, resistors 158 and 170 are each 100 ohms, resistor 164 is 1 k, resistor 174 is 10 k, and resistor 178 is 100 ohms, capacitor 154 is 100 picofarads, capacitor 166 is 470 picofarads, and capacitor 168 is 220 picofarads; diodes 160 and 172 may be embodied with part number BAS16LT1 manufactured by ON Semiconductor, transistor 162 may be embodied by part number MMBT3906LT1G, manufactured by ON Semiconductor; MOS-FET 176 may be embodied by part number 2N7002 manufactured by Fairchild.

An inverter logic level shut down circuit 38 is used by the micro-controller 28 to shutdown the PWM 40 when proper operating conditions do not exist. The micro-controller 28 will only enable the PWM 40 when the following operating conditions exist: (a) input voltage within the operation range of 8–18 volts; (b) lamp voltage within specification of less than 110 VAC; (c) proper start-up sequence of HID lamp 16 is initiated; and (d) latched fault conditions must not exist in the micro-controller 28. During initial turn-on of the HID ballast 12 the micro-controller output pins are in tri-state (high impedance state). Resistor 130 holds transistor 132 in the ON state. When the micro-controller 28 is ready to turn-on the PWM 40, it drives the SHUTDOWN 131 signal low, which turns transistor 132 off and enables the PWM 40. The inverter logic level shut down circuit 38 includes components with the approximate values as follows: resistor 130 is 10 ohms; and the transistor 132 may be embodied by part number MMBT3904LT1 manufactured by ON Semiconductor.

The pulse width modulator (PWM) 40 modulates the duty cycle of the flyback inverter 50 to regulate output power to the HID lamp 16. The PWM 40 includes an op-amp, peak current sense detection circuit, clock circuit, and gate driver flip flop (not shown). In this application, the op-amp of PWM 40 is configured as an inverting amplifier using resistor 134 and capacitor 136. The switching cycle starts with FETGATE 41 held low, and mosfet 56 is OFF. Time-OFF of the switching cycle is set by the clock circuit waiting for the voltage across capacitor 168 to reach 2.5 volts. The synchronization circuit 42 will terminate this cycle earlier if the falling edge of VDS 55 is detected. Transistor 176 is held in the OFF state by resistor 178. The next cycle begins with FETGATE 41 going high, turning FET 56 ON. Transistor 176 is driven ON by resistor 178. With transistor 176 ON the only way to change the state is for the current sense 37 signal to reach 1V. The current sense 37 signal charges to 1V through the RC time constant of resistor 140 and capacitor 152. At high input current there is also a charging contribution from resistor 138 and diode 144. After the current sense 37 signal reaches 1 Volt the cycle repeats. The pulse width modulator 40 may be embodied by part number UCC2803QDRQ1 manufactured by Texas Instruments.

The method of operating the high intensity discharge (HID) lamp 16 in either a normal mode of operation with a power output level of approximately 35 watts or an anti-theft mode of operation with the power output level switching between approximately 28 watts and 35 watts is controlled in accordance with the V-set lamp current 29 signal level from the micro-controller 28. The method comprises the steps of producing in the ballast power control circuit 24, which includes the flyback inverter 50 and the H-bridge 80, the required voltage and current to operate the HID lamp 16 from the predetermined input voltage (12 VDC), monitoring the produced current for the HID lamp 16 using the LAMP-CS 67 signal and generating the current sense 37 signal, regulating the HID lamp current (LAMP-CS 67) in response to the V-set lamp current 29 signal, providing a pulse width modulator 40 for modulating a duty cycle of the power control circuit 24 in response to the sensed HID lamp current signal (current sense 37) and the HID lamp current control signal (V-set lamp current 29), and synchronizing the pulse width modulator 40 in response to a switching signal (VDS 55) from the power control circuit 24.

The micro-controller 28 determines the HID lamp mode of operation by testing an HID lamp code (pre-stored in the micro-controller 28), monitoring the HID lamp voltage (LAMP-CS 67) and generating the HID lamp current control signal (V-set lamp current 29 signal) which has a first current level (based on 35 watt power to the HID lamp 16) for initiating the HID lamp 16 normal mode of operation and a second current level (based on 28 watt power to the HID lamp 16) for initiating the anti-theft mode of operation.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A ballast circuit for energizing an HID lamp having an anti-theft operating mode comprising:
    means for testing a signal from a vehicle to verify a vehicle code matches an HID lamp code, and when there is no match, said testing means initiates said anti-theft operating mode; and
    means for regulating an operating current of said HID lamp in accordance with a signal from said testing means, wherein said HID lamp output power fluctuates between a normal output power level and a predetermined lower output power level.

2. The ballast circuit as recited in claim 1 wherein said testing means comprises a preprogrammed micro-controller.

3. The ballast circuit as recited in claim 1 wherein said regulating means includes a pulse width modulator for controlling said output power level fluctuations.

4. The ballast circuit as recited in claim 1 where said HID lamp output power fluctuation produces a flickering light output at predetermined levels sufficient to maintain safe vehicle operation.

5. A method for operating a high intensity discharge (HID) lamp in a normal mode and an anti-theft mode comprising the steps of:
    testing a signal from a vehicle with means to verify a vehicle code matches an HID lamp code, and when there is no match initiating said anti-theft operating mode; and
    regulating an operating current of said HID lamp in accordance with a signal from said testing means, wherein said HID lamp output power fluctuates between a normal output power level and a predetermined lower power level.

6. The method as recited in claim 5 wherein said step of testing a signal from a vehicle to verify a vehicle code matches said HID lamp code comprises the step of providing a preprogrammed micro-controller to perform said testing.

7. The method as recited in claim 5 wherein said step of regulating an operating current of said HID lamp in accordance with a signal from said testing means comprises the step of providing a pulse width modulator for controlling said output power level fluctuations.

8. The method as recited in claim 5 wherein said step of regulating an operating current of said HID lamp with a signal from said testing means comprises the step of providing HID lamp output power fluctuations which are sufficient to maintain safe vehicle operation.

* * * * *